United States Patent Office 3,271,387
Patented Sept. 6, 1966

3,271,387
HIGH VISCOSITY STARCH DERIVATIVES
Chim Patel, St. Louis, Mo., and Ronald E. Pyle, Granite City, Ill., assignors to Union Starch & Refining Co., Inc., Columbus, Ind., a corporation of Indiana
No Drawing. Filed Oct. 10, 1962, Ser. No. 229,724
14 Claims. (Cl. 260—233.5)

The present invention relates generally to starch derivatives and more particularly to a novel high viscosity, water soluble starch product and to a novel method for producing it from unmodified starch. Specifically, the present invention pertains to a thick-boiling starch ester prepared from unmodified starch, using chlorothioformate esters as the principal reactants.

An object of the present invention is to produce a modified starch product which gives higher stable viscosity pastes than unmodified starch when cooked either with water or alkaline solution.

A second object of this invention is to produce a modified starch product which gelatinizes at a lower temperature than common for the unmodified starch from which it is made.

Another object is to prepare a modified starch product which yields a softer cold paste than that of the unmodified starch.

A further object of this invention is to produce a modified starch product having the above-listed properties by a method which does not disrupt the starch granules through gelatinization.

This invention is based on the discovery that the starch with various chlorothioformate compounds under the conditions specified produces modified starch products which yield higher paste viscosities than obtained from the unmodified starch.

Briefly, the objects of the present invention are attained by reacting a relatively small amount of an alkyl or aryl chlorothioformate ester with unmodified starch, under controlled conditions of pH, and concentration of the chlorothioformate ester to produce a water soluble thick-boiling starch.

The starch is preferably in the form of a slurry. The time, temperature and Baumé of the starch slurry are minor variables in the reaction as disclosed below but these conditions may be varied over wide limits and are, therefore, not considered critical.

An additional advantage of the process of this invention is that starch slurries are treated under conditions especially suited to equipment common to the industry.

In the following teachings of the present invention, a starch slurry, i.e., unmodified corn starch granules and water at a temperature of about 20–55° C. and with a Baumé of 14 to 21 is acidified or made alkaline to adjust the pH thereof to preferably between 4 to 10. The starting pH of the slurry is usually in the neighborhood of about 3–5 and will depend upon the source of the corn, the time of the year of its harvest and conditions in the plant which produces the starch slurry. Any base or acid may be used which will adjust the pH to a suitable level, such as sodium carbonate ($Na_2CO_3$), hydrochloric acid or the like. It should be borne in mind that the base or acid is not used to "modify" the starch but to adjust the pH of the slurry prior to the addition of the reactant.

Our study of the reaction and product obtained by the process leads us to the belief that the product obtained is actually a mixed ester of carbonylmonothio acid, CO(SH)OH, and has the formula

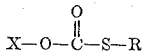

where X is the starch radical and R is an alkyl, alkylene, or aryl group. In accordance with this theory the reaction which takes place is a follows:

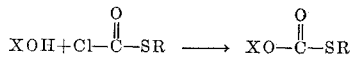

We are aware that allyl chloroformate has been proposed as an etherifying agent for starch (see U.S. 2,668,156). We have found, however, that the chlorothioformate is much more reactive with starch than the chloroformates and that they react with starch at close to the neutral range of pH. Obviously the resultant products are different.

The amount of chlorothioformate ester employed for modification may vary from 0.03% to about 1.0%, based on dry substance starch. With 0.05% of the chlorothioformate, a significant increase of hot paste viscosity in water and maximum alkaline viscosity are noted. As more of the chlorothioformate ester is reacted with the starch, the viscosity of the modified starch increases; the chlorothioformate esters, however, form insoluble starch when reacted at concentrations of more than 1.0% with unmodified starch. The reaction can be conducted at a pH level above about 4 and up to about pH 10. The preferred pH range is 7–9.

The reaction proceeds satisfactorily at temperatures about 20 to 45° C. Some decrease in viscosity is observed at temperatures between about 49° and 55° C. Starch slurries at about 37–45° C., as delivered to the drying equipment in starch plants, work very satisfactorily in the process.

The reaction time is not critical. Starch slurries reacted from 1 to 24 hours or more before being sent to the dryers have been found to be satisfactory. Occasionally, it is not possible to dry a reacted starch immediately and the delay of 10 hours or more has not caused any change in the viscosity of the modified starch.

The starch may be treated in the form of a slurry as it comes from the final stage of the wet milling process. The slurry may have almost any density. When slurries of 14 to 21 Baumé have been treated under otherwise similar conditions, the resultant viscosities and other properties of the products are substantially the same.

After treating with chlorothioformate ester, the slurries are filtered and the starch is dried at about 115° C., for example, to about 10% moisture.

The measurement of the viscosity of hot starch pastes is used in the industry to determine the degree of modification of starch products. Hot paste viscosity is commonly determined by the Scott method and the Corn Industries' viscometer method. Procedures for these methods of analysis are described by R. W. Kerr in his book entitled, "Chemistry and Industry of Starch."

In addition to these tests, the maximum alkaline viscosity (MAV) was determined. In this test, 170 grams of starch (as-is basis )is mixed with 900 ml. of water at 49° C. and 100 ml. of 32% sodium hydroxide solution. This mixture is placed in a steam-jacketed vessel equipped with a mechanical agitator. Agitation is started and the temperature of the mixture is raised to 74° C. After holding at this temperature for 10 minutes, 900 ml. of tap water at 27° C. is added to the cooked starch paste. The mixture is cooled to 38° C. and the viscosity is measured by means of a Brookfield viscometer.

The following examples further illustrate the process of the invention.

The processes, as described below, are applied to corn starch. However, these processes are equally applicable for modifying other starches, such as potato, tapioca, rice, grain, sorghum and wheat starches.

EXAMPLE 1

A corn starch slurry sample of 20° Baumé corrected to 15.5° C. was separated into two equal parts. The first part was used as a control. To the second part, 0.03% dry substance basis (D.S.B.) of n-octyl chlorothioformate was added. The pH was adjusted to 9.0 and the slurry was held at 26–32° C. (room temperature) for 3 hours. Thereafter the slurry was neutralized to pH 5.0, filtered and the starch was dried at 115° C. to a 10% moisture content. The control was subjected to the same treatment but without the n-octyl chlorothioformate addition. The properties of the modified and control starch are set forth in Table I below.

*Table I*

| Example | Conc. of n-octyl Chlorothioformate, percent | Gel Temp., ° C. | Max. Visc., gm.-cm. | Visc. at 30, gm.-cm. | A.P.V., gm.-cm. | Scott Visc. | M.A.V., cps. | Alkali Number |
|---|---|---|---|---|---|---|---|---|
| Control | -------- | 87 | 140 | 110 | 1,400 | 90 | 1,100 | 8.28 |
| 1 | 0.03 | 86.0 | 163 | 140 | 1,200 | 130 | 1,800 | 8.00 |

Maximum Viscosity, Viscosity at 30 Minutes and Aged Paste Viscosity (A.P.V.) were measured in gram-centimeters with the Corn Industries' viscometer. Maximum Alkaline Viscosity (M.A.V.) was measured in centipoises with Brookfield viscometer. Alkali Number was determined according to the procedure given by Schoch and Jensen in the "Ind. Eng. Chem.," Anal. Ed., 12, 531 (1940).

Treatment of starch with 0.03% n-octyl chlorothioformate measurably influenced the viscosity characteristics of the starch when pasted with water and also with alkaline solution.

EXAMPLES 2–7

The process set forth in Example 1 was repeated with 0.05–1.0% concentrations of n-octyl chlorothioformate to determine the influence of the concentration of this reactant on the properties of the final product. The properties of the modified starch products (Examples 2–7) and of the unmodified controls for these samples are presented in Table II.

*Table II*

| Example | Conc. of n-octyl Chlorothioformate, percent | Gel Temp., ° C. | Max. Visc., gm.-cm. | Visc. at 30, gm.-cm. | A.P.V., gm.-cm. | M.A.V., cps. | Alkali Number | Scott Visc. |
|---|---|---|---|---|---|---|---|---|
| Controls (2–7) | 0 | 87 | 140 | 110 | -------- | 1,100 | 8.28 | 90 |
| 2 | 0.05 | 85.5 | 188 | 152 | 1,100 | 2,200 | -------- | 148 |
| 3 | 0.1 | 85.0 | 260 | 200 | 900 | 4,000 | 6.95 | 200+ |
| 4 | 0.2 | 84.0 | 290 | 225 | -------- | 6,800 | 6.13 | -------- |
| 5 | 0.3 | 87.5 | 240+ | 240 | -------- | -------- | 5.85 | -------- |
| 6 | 0.5 | 90.0 | 100+ | 100 | -------- | -------- | -------- | -------- |
| 7 | 1.0 | 0 | 0 | 0 | -------- | -------- | -------- | -------- |

It will be seen from the above table that the following modifications in viscosity properties have occurred:

(1) The gelatinization temperature was lowered 1–3° C. below that of the control samples. The gelatinization temperature reached a minimum in sample treated with 0.2% n-octyl chlorothioformate.

(2) In all cases, the maximum viscosity of the hot pastes was increased, reaching its greatest value at the 0.2% n-octyl chlorothioformate treatment level. Insoluble starch forms when unmodified starch reacted with more than 1.0% n-octyl chlorothioformate.

(3) Set back on cooling as measured by the Aged Paste Viscosity (A.P.V.) was significantly lowered. Maximum lowering of this property was reached at 0.2% n-octyl chlorothioformate treatment level.

(4) The Maximum Alkali Viscosity was much higher than the controls at all levels of treatment.

(5) The Alkali Number of the n-octyl chlorothioformate treated starches was lower than that of the controls.

Starches with these higher viscosities are especially useful for adhesives; corrugating paper; charcoal, coal and ore briquetting; textile finishings such as back sizing; filling certain kinds of fabrics; wet end addition in paper manufacturing and in acoustic tile manufacturing.

EXAMPLES 8–14

The influence of pH on the process set forth in Example 1 was determined by treating 20° Baumé starch slurries with 0.1% D.S.B. n-octyl chlorothioformate at 26–32° C. for 3 hours at pH levels of 4–10. The results are set forth in Table III and show that n-octyl chlorothioformate gives satisfactory results in the range pH 7.0–10.0. Also, there was some increase in viscosity between pH 4.0 and 6.0.

*Table III*

| Example | Conc. of n-octyl chlorothioformate, percent | pH | Gel. Temp., ° C | Max. Visc., gm.-cm. | Visc. at 30, gm.-cm. |
|---|---|---|---|---|---|
| Controls (8–14) | 0 | ------ | 86.0 | 140 | 110 |
| 8 | 0.1 | 4.0 | 86.0 | 155 | 120 |
| 9 | 0.1 | 5.0 | 86.0 | 162 | 125 |
| 10 | 0.1 | 6.0 | 85.5 | 170 | 132 |
| 11 | 0.1 | 7.0 | 85.0 | 190 | 160 |
| 12 | 0.1 | 8.0 | 85.0 | 230 | 190 |
| 13 | 0.1 | 9.0 | 84.5 | 252 | 200 |
| 14 | 0.1 | 10.0 | 84 | 260 | 220 |

EXAMPLES 15–19

Examples 15–19 were conducted substantially as Example 1 on a 20° Baumé starch slurry with 0.1% D.S.B. n-octyl chlorothioformate at a pH of 9.0 for 3 hours and at various temperatures as indicated in Table IV. The data obtained indicate that temperature ranges from 26–55° C. give satisfactory results although somewhat lower viscosity at higher reaction temperature.

*Table IV*

| Example | Temp., ° C. | Gel. Temp., ° C. | Max. Visc., gm.-cm. | Visc. at 30 min., gm.-cm. |
|---|---|---|---|---|
| Controls (15–19) | ------ | 87 | 135 | 110 |
| 15 | 26 | 85 | 240 | 180 |
| 16 | 38 | 85 | 210 | 170 |
| 17 | 43 | 85 | 195 | 162 |
| 18 | 49 | 84 | 178 | 135 |
| 19 | 55 | 84 | 170 | 125 |

The process has also been conducted at various reaction times but no significant differences in results have been noted between about 1 to over 24 hours of reaction time. Similarly, changing the Baumé of the slurry has been found to have no significant effect on the results.

EXAMPLES 20–24

Examples 20–24 were conducted substantially as Example 1 on a 20° Baumé starch slurry with 0.1% D.S.B. of various chlorothioformate compounds (ethyl, methyl, phenyl, dodecyl, n-propyl) for 3 hours at pH 9.0 and at room temperature (26–32° C.). The analyses indicate that they all (Examples 20–24) give the same result as n-octyl chlorothioformate.

Table V

| Example | Chlorothioformate | Gel. Temp., °C. | Max. Visc., gm.-cm. | Visc. at 30 min., gm.-cm. | Scott Visc. |
|---|---|---|---|---|---|
| Controls (20–24) | | 87.0 | 117 | 90 | 74 |
| 20 | Ethyl chlorothioformate | 85.0 | 178 | 158 | 170 |
| 21 | Methyl chlorothioformate | 85.5 | 170 | 130 | 142 |
| 22 | Phenyl chlorothioformate | 87.0 | 155 | 140 | 140 |
| 23 | Dodecyl chlorothioformate | 85.0 | 180 | 146 | 152 |
| 24 | n-Propylchlorothioformate | 84.0 | 164 | 150 | 138 |

The features and principles underlying the invention described above in connection with specific exemplifications will suggest to those skilled in the art many other modifications thereof. It is accordingly desired that the appended claims shall not be limited to any specific feature or details thereof.

We claim:

1. The process as claimed in claim 13 wherein the chlorothioformate ester is the n-octyl ester thereof.
2. The process as claimed in claim 13 wherein the chlorothioformate ester is the methyl ester.
3. The process as claimed in claim 13 wherein the chlorothioformate ester is the ethyl ester.
4. The process as claimed in claim 13 wherein the chlorothioformate ester is the phenyl ester.
5. The process as claimed in claim 13 wherein the chlorothioformate ester is the dodecyl ester.
6. The process as claimed in claim 13 wherein the chlorothioformate ester is the propyl ester.
7. The starch derivative as claimed in claim 14 wherein R is an n-octyl radical.
8. The starch derivative as claimed in claim 14 wherein R is a methyl radical.
9. The starch derivative as claimed in claim 14 wherein R is an n-ethyl radical.
10. The starch derivative as claimed in claim 14 wherein R is a phenyl radical.
11. The starch derivative as claimed in claim 14 wherein R is a dodecyl radical.
12. The starch derivative as claimed in claim 14 wherein R is a propyl radical.
13. A process for preparing a high viscosity, water soluble starch derivative comprising
   providing an aqueous slurry of substantially unmodified starch having a pH of about 7–10,
   adding from about 0.03 to about 0.3%, based on the dry starch, of a chlorothioformate ester of an alcohol selected from the group consisting of alkyl alcohols of 1–12 carbon atoms and phenyl alcohol,
   maintaining the mixture at about 26–55° C. for a period of at least 1 hour, and
   recovering the modified starch from the mixture.
14. As a high viscosity starch derivative, the reaction product obtained by reacting starch with about 0.03 to about 0.3%, based on the dry starch, of a chlorothioformate ester of an alcohol selected from the group consisting of alkyl alcohols of 1–12 carbon atoms and phenyl alcohol, the reaction being carried out at a pH of 7–10 and at a temperature of 26–55° C.

References Cited by the Examiner

UNITED STATES PATENTS 2,668,156  2/1954  Caldwell _____ 260—233.3 X
2,863,899  12/1958 Harris _____ 260—455

LEON J. BERCOVITZ, *Primary Examiner.*

WILLIAM H. SHORT, *Examiner.*

E. C. EDWARDS, R. W. MULCAHY,
*Assistant Examiners.*